United States Patent [19]

McMillan, Jr.

[11] Patent Number: 5,687,390
[45] Date of Patent: Nov. 11, 1997

[54] HIERARCHICAL QUEUES WITHIN A STORAGE ARRAY (RAID) CONTROLLER

[75] Inventor: Ben H. McMillan, Jr., Middletown, N.J.

[73] Assignee: ECCS, Inc., Tinton Falls, N.J.

[21] Appl. No.: 557,239

[22] Filed: Nov. 14, 1995

[51] Int. Cl.$^6$ .................................................. G06F 13/10
[52] U.S. Cl. .................. 395/825; 395/444; 364/244.3; 364/243; 364/243.7
[58] Field of Search ..................... 395/603–608, 395/185.08, 292, 438–441, 444, 496, 825–826, 840–841, 872–877, 800, 182.04, 182.05, 182.06, 182.07

[56] References Cited

U.S. PATENT DOCUMENTS

| | | | |
|---|---|---|---|
| 5,224,215 | 6/1993 | Disbrow | 395/250 |
| 5,276,838 | 1/1994 | Rao et al. | 395/444 |
| 5,313,626 | 5/1994 | Jones et al. | 395/182.03 |
| 5,367,669 | 11/1994 | Holland et al. | 395/182.05 |
| 5,418,921 | 5/1995 | Cortney et al. | 395/441 |
| 5,421,014 | 5/1995 | Bucher | 395/650 |
| 5,509,134 | 4/1996 | Fandrich et al. | 395/430 |
| 5,555,396 | 9/1996 | Alfemess et al. | 395/474 |

FOREIGN PATENT DOCUMENTS

| | | |
|---|---|---|
| 04101233 | 4/1992 | Japan . |
| 0535509 | 2/1993 | Japan . |

*Primary Examiner*—Lance Leonard Barry, Esq.
*Attorney, Agent, or Firm*—Thomason & Moser

[57] ABSTRACT

A queuing architecture within a RAID controller that manages a multi-threaded SCSI environment. The architecture resides within a RAID controller that communicates with a plurality of independent, SCSI disk drives (or other storage elements). The RAID controller accepts disk I/O requests from one or more host computers. The architecture dynamically allocates multiple disk I/O requests to various request queues until the disk drive that will handle the request is available for access. Multiple requests are executed in parallel on various ones of the disk drives.

12 Claims, 6 Drawing Sheets

FIG. 3A
QUEUE ARCHITECTURE
OPERATION
FLOW CHART
300

QUEUE ARCHITECTURE
OPERATION FLOW CHART
400

FIG. 5

HIERARCHICAL QUEUES WITHIN A STORAGE ARRAY (RAID) CONTROLLER

BACKGROUND OF THE DISCLOSURE

1. Field of the Invention

The invention relates to storage array controllers and, more particularly, to a queuing architecture for multi-threaded operation of a storage array.

2. Description of the Background Art

Computer system input/output (I/O) performance is directly related to the efficiency of data communication between a computer and its peripheral storage devices. Generally, the amount of time necessary to process information is far less than the amount of time necessary to retrieve data from a mass storage device such as a hard disk drive. As such, much time and effort has been expended in improving the data communications between computers and their associated storage devices. The communications path between a computer and a single storage element is generally referred to as a thread.

Substituting, for a single storage element, an array of storage elements improves the communications between the computer and the storage subsystem. Using simultaneous communications paths between a computer and a plurality of storage elements is referred to as multi-threaded operation. In a multi-threaded system, the computer may issue a command to a second storage element prior to completion of a previously issued command to a first storage element. As such, the efficiency of the communication is improved over that of a single thread system.

Typically, the storage elements within an array of storage elements use the Small Computer Systems Interface (SCSI) to facilitate data access in response to a standardized set of commands. The SCSI standard is defined in the SCSI-2 Specification ANSI X3T9.2/375R, revision 10K. In an array of SCSI storage devices, an architecture for handling commands and facilitating contentionless access to the various storage elements within the multi-threaded environment is necessary. U.S. Pat. No. 5,421,014, issued May 30, 1995 and incorporated herein by reference, describes one form of controller for use in a multi-threaded environment. This controller, located in the computer as a low level driver, performs SCSI disk drive access management to facilitate multi-threaded access to the various disk drives forming a storage array.

A rather recently developed form of storage element array is a redundant array of independent disks (commonly referred to as RAID or a RAID array). Such arrays may contain plurality of independent SCSI disk drives as well as other forms of storage devices. However, for simplicity, it is assumed that the storage elements are hard disk drives. A RAID array can be arranged in any one of a number of well-known configurations as defined in The RAIDbook, A Source Book of Disk Array Technology, 4th ed., published by The RAID Advisory Board, Apr. 1, 1995. A RAID array of SCSI disk drives must be controlled to meet both the RAID standards and the SCSI standards. As such, data access commands issued by the computer to the array must be handled by a RAID controller such that access contention is avoided in the multi-threaded environment.

Therefore, a need exists in the art for a queuing architecture within a RAID array controller that manages a multi-threaded SCSI environment.

SUMMARY OF THE INVENTION

The present invention is a queuing architecture within a RAID controller that manages a multi-threaded SCSI environment. The architecture resides within a RAID controller that communicates with a plurality of independent, SCSI disk drives (or other storage elements). The RAID controller accepts disk I/O requests from one or more host computers. The architecture dynamically allocates multiple disk I/O requests to various request queues until the disk drive that will handle the request is available for access. Multiple requests are executed in parallel on various ones of the disk drives. Since the requests are handled in parallel, the RAID controller does not have to reorder the requests. As such, data access speed is improved. The architecture also handles REQUEST SENSE commands in an efficient localized manner.

Specifically, the invention is a queue architecture for a storage element array containing a plurality of storage elements comprising: a volume manager for generating an input/output (I/O) request that specifies a particular storage element to be accessed; an asynchronous disk I/O system, connected to the volume manager, for allocating the I/O request to a particular pending queue, where the particular pending queue is selected in accordance with the storage element specified within the I/O request; a staging queue, connected to the pending queue; for temporarily storing the I/O request until a communications channel is available to connect the staging queue to the storage element; and a timeout queue, connected to the staging queue, for temporarily storing the I/O request after the I/O request is placed on the communications channel and for removing said I/O request when the communications channel returns information corresponding to the I/O request.

BRIEF DESCRIPTION OF THE DRAWINGS

The teachings of the present invention can be readily understood by considering the following detailed description in conjunction with the accompanying drawings, in which:

FIG. 3 which comprises FIG. 3A and FIG. 3B, depicts a flow chart of a method of operation of the queuing architecture of FIG. 2 to communicate a I/O request from the host computer to a selected disk drive;

To facilitate understanding, identical reference numerals have been used, where possible, to designate identical elements that are common to the figures.

DETAILED DESCRIPTION

Figure 1:
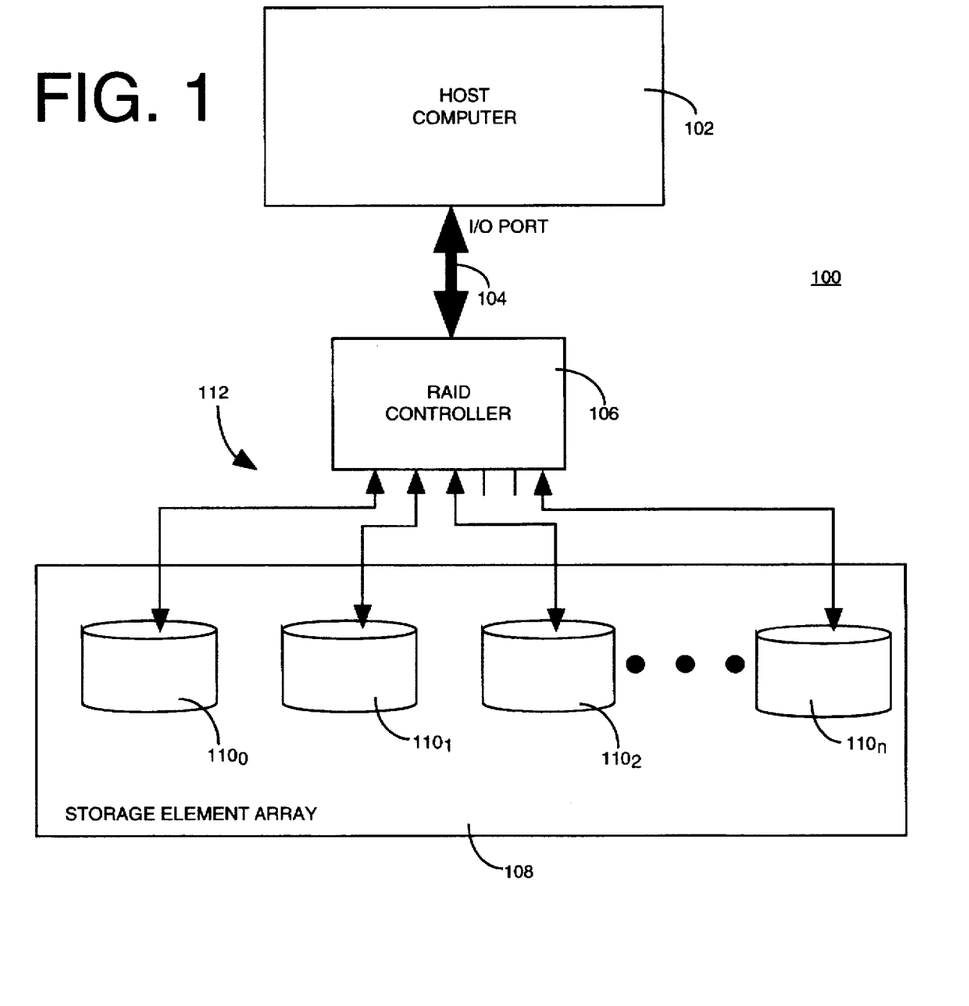
FIG. 1 depicts a block diagram of a computer system incorporating the present invention.

FIG. 1 depicts a computer system which incorporates the teachings of the present invention. Specifically, the computer system 100 contains a host computer 102, a redundant array of independent disks (RAID) controller 106, and a storage element array 108. The host computer 102, of which there may be more than one, can be any general purpose computer system such as a model A11 or model A14 manufactured by Unisys Corporation of Blue Bell, Pennsylvania. The RAID controller may be integrated into either the host computer or as a portion of a RAID subsystem 112.

If the RAID controller is integrated into the host computer, the computer is, in essence, connected directly to multiple storage elements. In contrast, if the RAID controller is external to the host computer, the computer requests data through its input/output port 104 as if it were accessing a single, SCSI storage element, i.e., through its SCSI driver. The RAID controller maps the data requests to the appropriate individual storage element. In the preferred embodiment of the invention, the RAID controller will be described as being a portion of the RAID subsystem 112.

The RAID subsystem contains the RAID controller 106 and a storage element array 108. The array contains a plurality of storage elements $110_n$, where n is an integer value: n=0, 1, 2, 3 and so on. The storage elements are typically hard disk drives that comply with the SCSI-2 interface specification. However, the storage elements could be any type of storage element or combination of different storage element types. For the following discussion, the storage elements are illustratively described as being SCSI disk drives. Each drive in the array is connected to the RAID controller 106 via a SCSI target interface that is an integral portion of each SCSI disk drive.

The RAID controller 106 manages the multi-threading capabilities of the SCSI drives by exploiting the SCSI-2 tagged queuing feature while maintaining strict control over the processing requests issued by the computer. The RAID controller provides this feature without substantially increasing computer processor overhead. To exploit the tagged queuing feature the RAID controller provides a queuing architecture that manages I/O requests as they are issued by the computer. The RAID controller routes the requests to the appropriate disk drive as well as queue the requests to avoid access contention.

Figure 5:
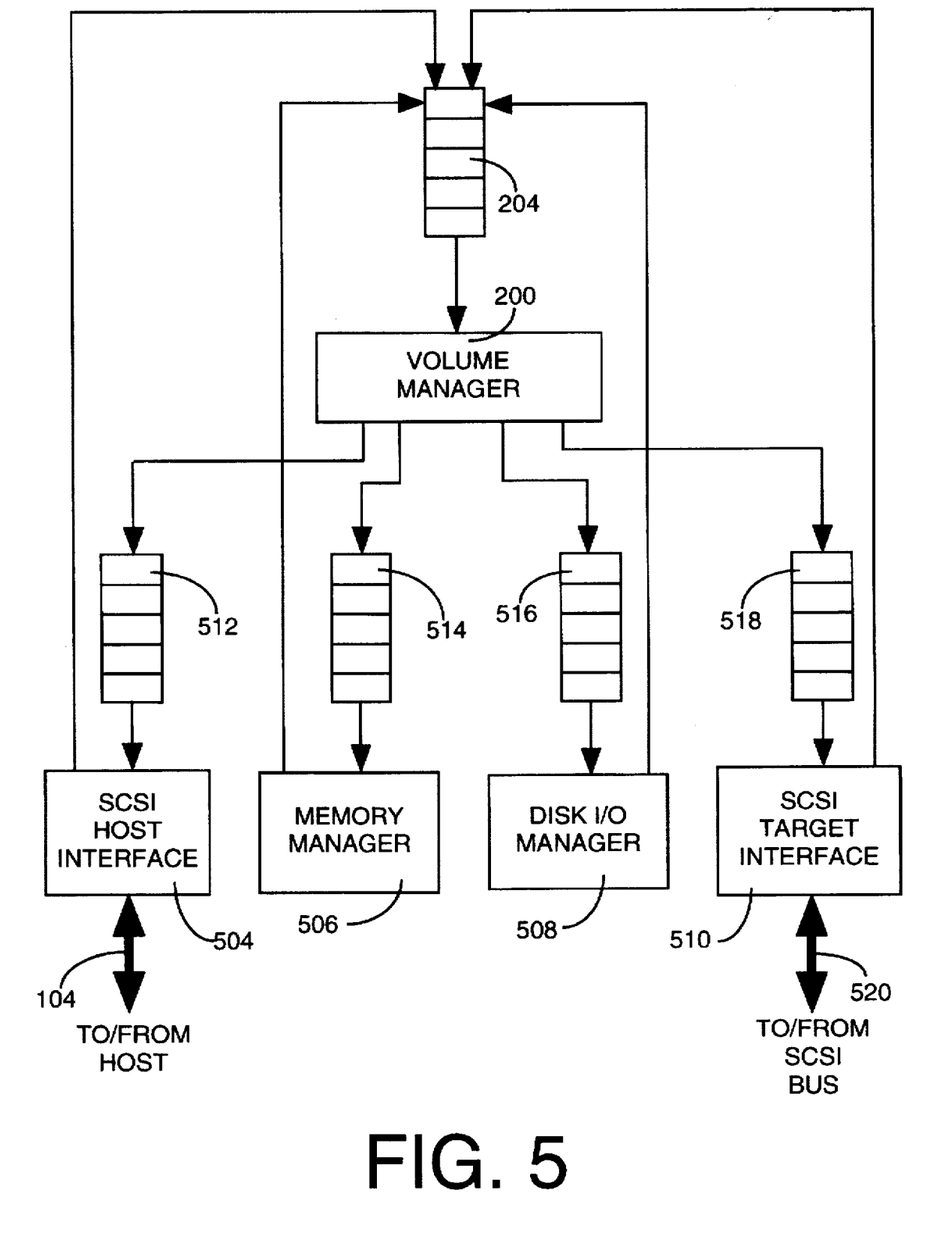
FIG. 5 depicts a block diagram of a RAID controller of the computer system shown in FIG. 1.

FIG. 5 depicts a block diagram of the RAID controller 106. The RAID controller contains at least one volume manager 200, a SCSI host interface (SHI) 504, memory manager 506, disk I/O manager 508, and SCSI Target Interface (STI) 510. Each of these blocks operate in conjunction with associated input queues 204, 512, 514, 516, and 518. I/O requests are sent to and received from the host computer along path 104 emanating from the SHI 504. Those requests are forwarded to the volume manager 200 via its input queue 204. The volume manager controls the memory manager 506 and the disk I/O manager 508 in a conventional manner. These resources do not form part of the invention and, as such, will not be discussed. The present invention is implemented mostly within the STI 510 as a unique queuing architecture for the I/O requests. In addition to the queuing architecture, the STI forms the physical connection, along path 520, to a plurality of SCSI buses and the various disks 110 that are connected to those buses. The physical connection is made to the target SCSI interface integrated circuits, e.g., model FAS366 integrated circuits manufactured by Emulex.

Figure 2:
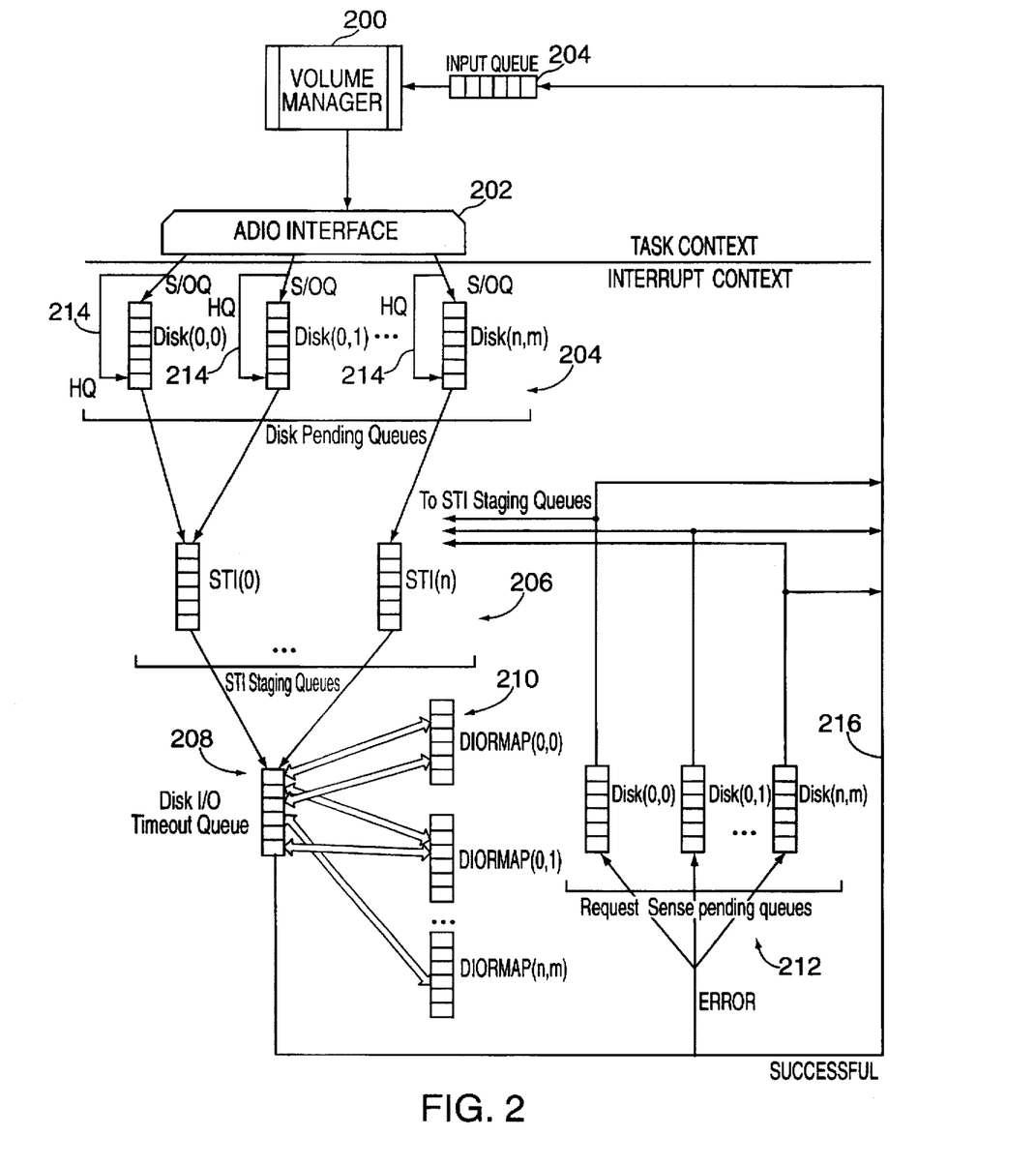
FIG. 2 depicts a diagram a queuing architecture for managing the multi-threaded SCSI environment of a RAID array.

FIG. 2 depicts the queuing architecture of the present invention. The queuing architecture contains the volume manager 200, an asynchronous disk input/output interface (ADIO Interface) 202 and a plurality of addressable registers (queues). The host computer transfers, from its internal SCSI host interface, conventional SCSI input/output (I/O) disk drive requests to the volume manager. These requests are buffered in input queue 204, a first-in, first-out (FIFO) register, after processing by the SHI. The input queue 204 is connected to the volume manager 200.

Specifically, the volume manager is responsible for servicing the host I/O requests. Upon receiving a host I/O request, the volume manager generates a particular disk I/O request that will fulfill the host I/O request. The volume manager issues a series of disk I/O requests, where each request is addressed to a particular disk drive for implementation.

The volume manager 200 is connected to the ADIO interface 202. The ADIO interface provides an interface that permits the "task level" RAID volume manager(s) to issue asynchronous I/O requests to the individual disk drives. The ADIO routes each request to an appropriate queue that will ultimately fulfill the I/O request using a particular disk drive. The ADIO interface 202 examines the disk I/O request as well as the disk pending queues 204 and the SCSI Target Interface (STI) staging queues 206. If the disk pending and STI staging queues are both empty, a disk I/O request is immediately inserted onto the back of one of the STI staging queues, i.e., as the last request in the queuing order. However, if queues 204 and 206 are not empty, the disk I/O request is inserted into the back of the disk pending queue 204. Nonetheless, if the disk I/O request happens to be a "Head of Queue" (HQ) tagged request, then the disk I/O request is inserted in the front of the disk pending queue 204 as indicated by path 214. All "Simple Queue" (S) tagged requests or "Ordered Queue" (OQ) tagged requests are inserted into the back of the queue.

The disk pending queues 204 store all disk I/O requests that are awaiting execution for a particular disk drive. Each disk drive has an associated disk pending queue denoted as Disk(n,m), where n is an integer indicating which target I/O communications channel (SCSI bus) that connects the particular disk to the RAID controller, and m is an integer indicating the address (SCSI bus ID) at which the disk responds. As such, the RAID controller has n•m disk pending queues 204.

Since the target I/O channel can only service one disk I/O request physical connection at a time, the STI staging queues 206 are used to sequentialize the disk I/O requests emanating from each disk pending queue 204. The RAID controller contains n STI staging queues, one for each target I/O channel (SCSI bus). Each STI staging queue stores a disk I/O request that is awaiting issuance to a disk drive connected to a specific SCSI bus. Only one disk I/O request per disk drive is allowed in a particular STI queue and such requests remain in the queue until the disk has acknowledged acceptance of the request. Thereafter, the disk I/O request is placed onto the disk I/O timeout queue 208.

The RAID controller contains a single disk I/O timeout queue 208. This queue provides a location for the executing I/O requests to reside while there execution time is being measured by the STI module. Measurement of an execution time is a well known concept that can be implemented in many ways. One example is a "delta list" disclosed by Comer et al. in Operating System Design, Volume 1, The XINU Approach (PC Edition), Prentice-Hall (1988).

When a request has been completed by the disk, the I/O request is removed from the timeout queue 208. Upon a successful disk access, the accessed disk returns either a write acknowledgment or the data read from the drive. Either event indicates the end of the access and, as such, the I/O request is removed from the timeout queue. The I/O request is returned, along path 216 to the input queue 204 of the volume manager. When the successful I/O request is again input to the volume manager, the volume manager sends the write acknowledgment or the data to the host.

Importantly, the timeout queue maintains the original order in which requests were issued to the disk (s). If a catastrophic error occurs (such as a SCSI bus reset) and all currently executing disk I/O requests must be reexecuted, the timeout queue can be read such that the requests can be reissued in the original order. This requires that all requests have the same timeout period.

Upon the occurrence of a catastrophic failure, e.g., a drive does not respond within the timeout period, a SCSI protocol error occurs, a disk drive fails and the like, the SCSI bus(es) is generally reset and the I/O requests that were in the timeout queue must be reissued to the disks on the bus. To facilitate reissue of the requests, the currently pending I/O requests within the timeout queue are pushed up the queuing stream (also known as backing out the requests) such that the pending requests are reloaded into the staging and pending queues 206 and 204. Then, after the SCSI bus is reset, the STI begins processing the queued requests again. As such, there is no loss of information resulting from the reset operation.

However, because the conventional timeout queue orders the requests in accordance with their expiration times, the foregoing reset process requires that all the requests have the same timeout period. For a system that does not use the same timeout period for all requests, a count stamp is implemented which marks the requests by stamping a count value into the disk I/O request structure. The count value is incremented by one count every time a request is tagged. As such, each request is time tagged with a count value as the requests pass through the ADIO interface. When a retry operation is in effect, e.g., upon a SCSI reset, the I/O requests are reissued in ascending order corresponding to the count stamp.

To perform an I/O request, the SCSI bus is temporarily connected to the STI staging queue and a request therein is transferred to a particular disk drive as well as to the timeout queue. When an acknowledgment is transferred from the specified disk to the STI module, the request is removed from the STI staging queue. After the acknowledgment is returned and the disk processes the request, the bus disconnects from the STI staging queue. Once disconnected, the bus may be used by other queues to access its disks while the first request is processed. Upon completion of the disk access, the bus reconnects with the timeout queue to provide the awaiting request with data from the access. This data could be data requested from the disk, an acknowledgment of a write command and the like. To transfer the data to the appropriate request within the timeout queue, the timeout queue is typically searched until the request is found. However, such a search process is time consuming. Consequently, the present invention uses a plurality of disk I/O request map (DIORMAP) execution lists 210. Simply stated, the DIORMAPs store an array of pointers that enable particular I/O requests to be rapidly found. The information returned from the disk drive carries the index such that the I/O request which requested that information can instantly be recalled.

Specifically, the timeout queue 208 communicates with the plurality of disk I/O request map (DIORMAP) execution lists 210. The lists 210 are an array of pointers to disk I/O requests of length DIORMAPLength(n,m). Each disk in the subsystem has its own DIORMAP list. This list is indicated using the notation DIORMAP(n,m). In total, there are n•m DIORMAP lists used by the RAID controller.

A disk I/O request queue tag ID is assigned to each request as the requests are stored in the STI staging queues and these IDs are used as an index into the DIORMAP list. This enables the STI resource to access the disk I/O request, after the disk access is complete, without having to search for the request in the disk I/O timeout queue.

If the disk drive returns the information that responds to the request, that information is merged into the I/O request and the successful request is routed along path 216 to the input queue 204. In this manner, the volume manager learns that the request is complete and, in response, passes the appropriate information to the SHI and, ultimately, to the host computer.

If an error occurs in accessing a particular disk, the SCSI bus will return a specific status indicator. Whenever the I/O request returns a status of CHECK CONDITION in lieu of the information that was requested, the I/O request is placed in one of the request sense pending queues 212. The SCSI protocol requires that the initiator (in this case, the RAID controller) issue, in response to the CHECK CONDITION status, a REQUEST SENSE command in order to determine the cause of the problem. The disk I/O request is placed in the queue 212 until the REQUEST SENSE command has been executed by the drive. The I/O request is then removed from the queue and inserted onto the input queue 204 of the volume manager 200 that issued the disk I/O request. There is one request sense pending queue for each disk drive.

Using this request sense queuing architecture ensures that error handling is accomplished within a low level of the architecture, i.e., the volume manager is not involved with error handling. Specifically, the request sense pending queues 212 are coupled to the STI staging queues 206. The REQUEST SENSE commands are directly sent from the request sense pending queues to the STI staging queues without involvement of higher level functions within the STI module or from the volume manager. The STI pending queues handle the REQUEST SENSE commands as if they were tagged as HQ commands, i.e., the REQUEST SENSE commands are priority processed and moved to the head of the queue. The REQUEST SENSE command is then processed as a disk I/O request in the manner discussed above. The REQUEST SENSE command should access an error code or some other error information from the disk drive. Thereafter, the I/O request in the request sense pending queue will have the error information added thereto and then be sent to the volume manager. As such, the volume manager is informed of the error as well as informed of the nature of the error. The volume manager, in response to the nature of the error, can then commence the appropriate action, e.g., avoid accessing the drive, reset the drive, generate a user warning signal and the like.

Figures 3, 3A:
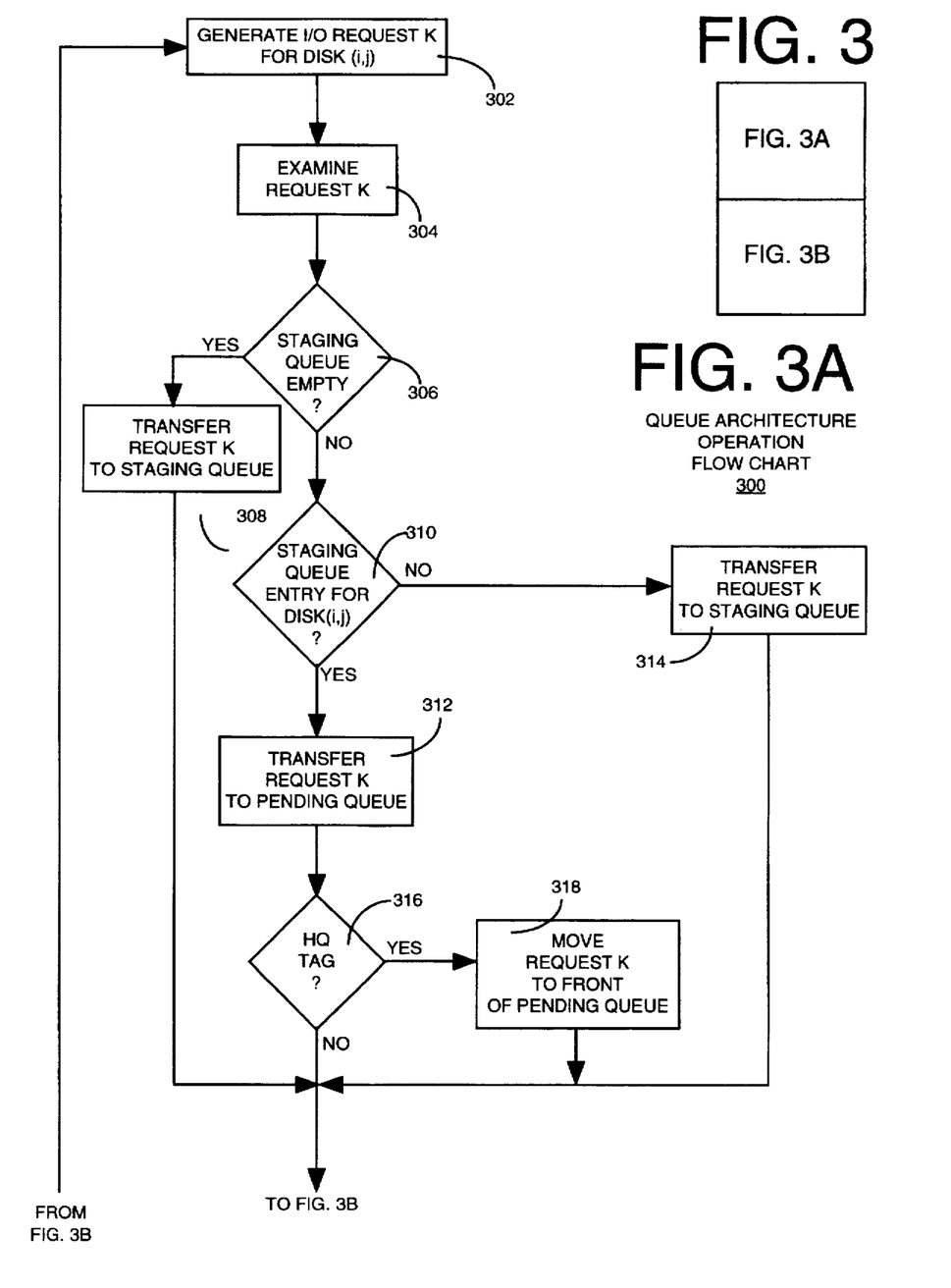
Figure 3B:
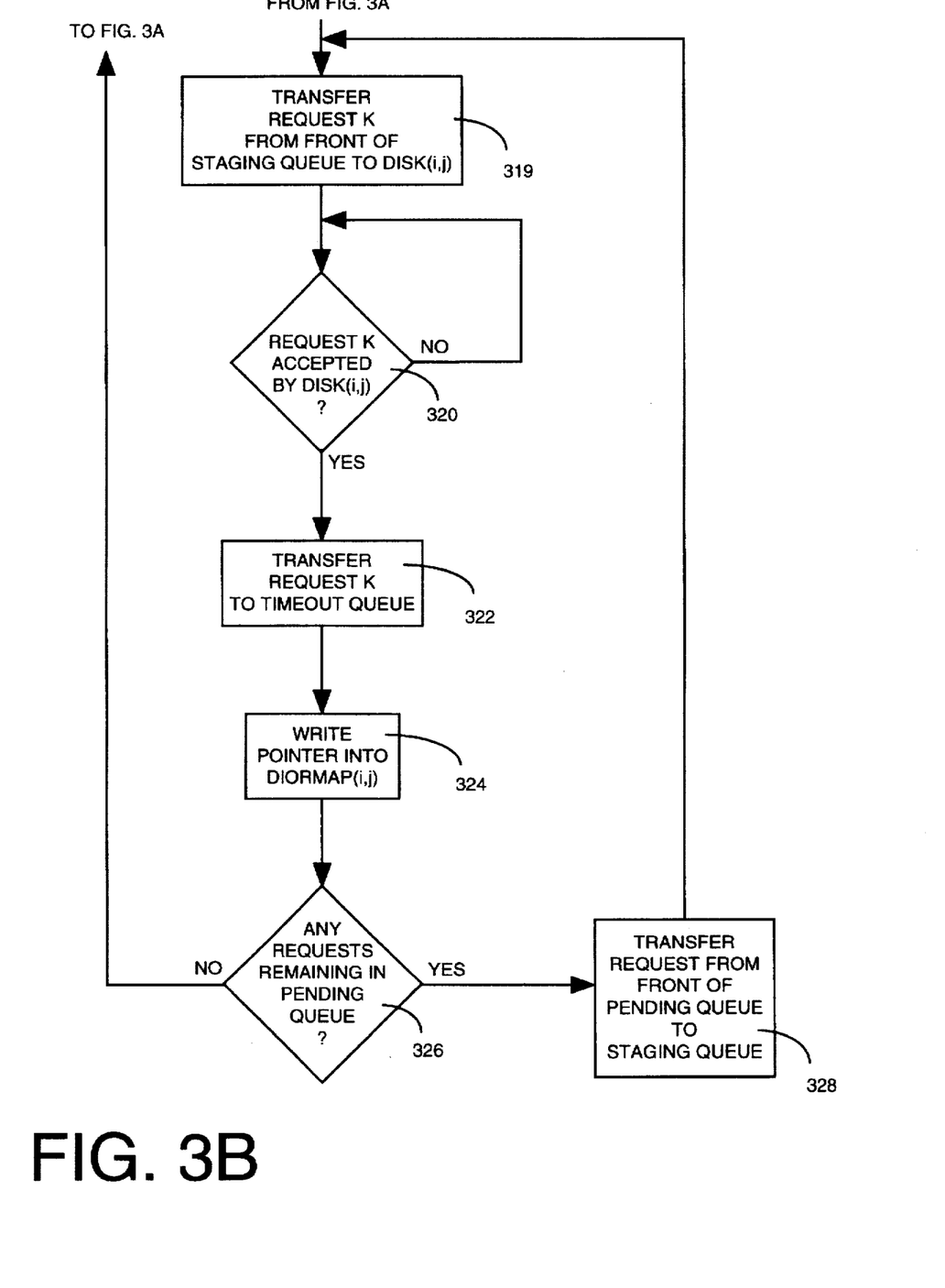

FIG. 3 depicts a flow chart 300 of the operation of the queue architecture of FIG. 2 when a request is proffered by the host computer to the RAID controller. The operation of the queue architecture when information is propagating from the disk drives to the RAID controller is discussed with respect to FIG. 4.

Process 300 begins at step 302, wherein the volume manager, in response to an I/O request from the host computer, generates a disk I/O request K for disk (i,j). The request K is communicated to the ADIO interface.

At step 304, the ADIO interface examines the disk I/O request K to ensure that the request is valid.

Then, at step 306, the ADIO interface checks to see if there are any other pending (disk(i,j) pending queue) or staged (STI(i) staging queue) disk I/O requests for the requested disk(i,j). If the STI(i) staging queue does not contain an entry for this disk(i,j), this indicates that the disk(i,j) pending queue is empty. If the disk(i,j) pending queue is not empty, the STI(i) queue must contain a disk I/O request for this disk (i,j ).

If the STI(i) staging queue is empty (query at step 306 affirmatively answered), the ADIO interface inserts, at step 308, the disk I/O request K directly onto the STI(i) staging queue and issue the disk I/O request K to the disk drive immediately. If the STI(i) staging queue is not empty and does not contain an entry for this disk(i,j) (query at step 306 negatively answered and query at step 310 negatively answered), the new I/O request is inserted, at step 314, onto the back of STI(i) staging queue waiting to be sent to the disk drive. However, if the STI(i) staging queue already contains a disk I/O request for the current disk(i,j) (query at step 310 affirmatively answered), the new request is inserted, at step 312, onto the disk(i,j) pending queue.

If the new I/O request is a Head of Queue tag type request (query at step 316 affirmatively answered), the new I/O request is inserted, at step 318, onto the front of the disk(i,j) pending queue. If the new I/O request is an simple (S) or ordered queue (OQ) tag type request (query at step 316 is negatively answered), the I/O request remains in the back of the disk(i,j) pending queue. Note that the actual determination of whether or not a disk I/O request for a particular disk(i,j) exists in the STI(i) staging queue is accomplished with a flag in the disk(i,j) control structure. This flag is set when a disk I/O request is inserted into the STI(i) staging queue for this disk(i,j) and is cleared when a disk I/O request for this disk(i,j) is removed from this STI(i) staging queue.

At step 319, the process connects the RAID controller to the SCSI channel for disk (i,j) and transfers the I/O request K to the disk drive. The disk I/O staging remains on the STI(i) staging queue until after the disk has accepted the request, i.e., until query 320 is affirmatively answered. At this time, the new request K is removed, at step 322, from the STI(i) staging queue and inserted into the disk I/O timeout queue. At step 324, a pointer to the disk I/O request K is written to the DIORMAP(i,j) execution list using the queue tag ID in the disk I/O request K as an index into this array. The DIORMAP facilitates a lookup technique (discussed below with respect to FIG. 4) that is used later when the disk reselects the RAID controller to complete the request.

As the disk I/O request K is removed from the STI(i) staging queue, the process examines, at step 326, the disk (i,j) pending queue to see if there are anymore requests on this queue. If so, the disk I/O request on the front of the disk(i,j) pending queue is moved, at step 328, to the back of the STI(i) staging queue. The STI driver then examines, at step 319, the front of the STI(i) staging queue and begin execution of this disk I/O request. If no further requests remain in the disk(i,j) pending queue, the process continues processing disk I/O requests by returning to step 302. After each request is sent to a specific disk drive, the SCSI channel terminates.

Figure 4:
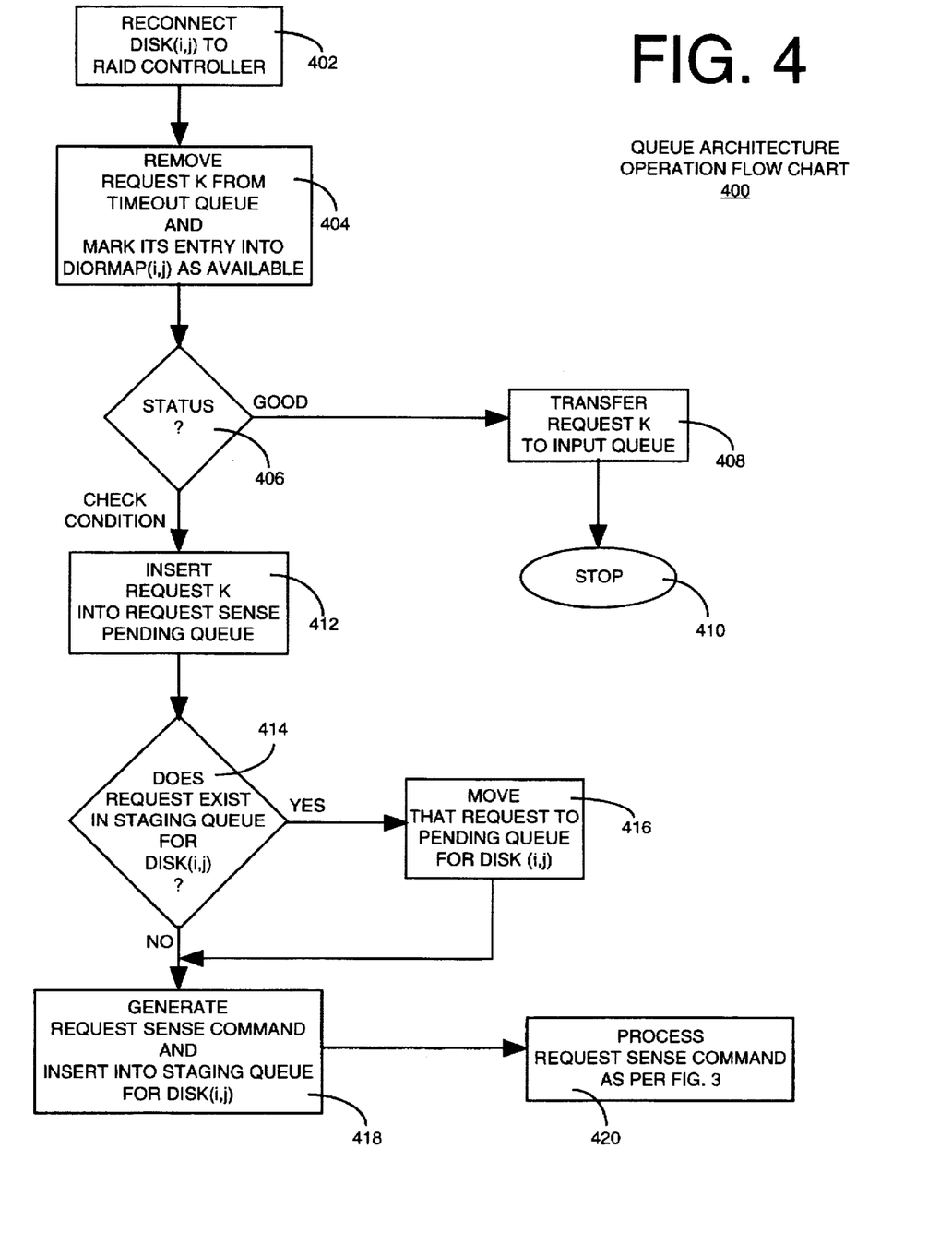
FIG. 4 depicts a flow chart of a method of operation of the queuing architecture of FIG. 2 to communicate a I/O request from disk drive to the host computer.

FIG. 4 depicts the operation of the queue architecture when the I/O request is completed by the SCSI drive and the drive reconnects its SCSI channel to the RAID controller. At step 402, it is assumed that execution of the disk I/O request K within disk(i,j) is complete and, as such, the disk reconnects with the RAID controller. In the case of a WRITE request, the disk acknowledges that it has written the data to its media or in the case of a READ request, the disk returns the data for sending to the RAID controller and, ultimately, to the host computer.

To facilitate the reconnection, the STI module accepts the reselect by the disk and determines which disk I/O request is completed by using the queue tag ID to index into the DIORMAP(i,j) execution list. It is assumed that this reconnection is in response to execution of the disk I/O request K.

The physical I/O connection over the target I/O channel is completed by the STI module. At step 404, the disk I/O request K is removed from the disk I/O timeout queue and its entry in the DIORMAP(i,j) execution list is marked as available. The process queries, at step 406, whether the status of request was GOOD or CHECK CONDITION. If the status of the request was GOOD, then the disk I/O request K is inserted, at step 408, onto the input queue of the volume manager. The volume manager processes this request to complete the original Host I/O request and the routine stops at step 410.

If the disk I/O request K returned a status of CHECK CONDITION, this indicates that the new request did not complete successfully. The SCSI specification requires that the initiator (the RAID controller in this case) issue a REQUEST SENSE command to determine the cause and specifics of the error. Although the new request K will be removed from the disk I/O timeout queue and its entry in the DIORMAP (i,j) execution list will be marked available, the request K will be inserted, at step 412, onto the disk (i,j) request sense pending queue. The SCSI specification requires that, on a contingent allegiance condition, the target controller must suspend all processing of tagged commands until an untagged REQUEST SENSE command is issued to the target controller to clear the contingent allegiance condition. However, in using practical disk drives, the queue architecture must consider that the target controller, in this case the disk drive, may not follow the SCSI specification. As such, the queue architecture must handle multiple failed requests.

To handle multiple failed requests, a REQUEST SENSE command is issued immediately by placing the command into the STI(i) staging queue. Before this can be done though, if a disk I/O request M for disk (i,j) exists in the STI(i) staging queue, the process needs to remove the disk I/O request M from the STI(i) staging queue and insert it into the front of the disk (i,j) pending queue. As such, if the query at step 414 is affirmatively answered, the process, at step 410, removes any request to disk(i,j) residing in the STI(i) staging queue to the disk(i,j) pending queue. Thereafter, or if there were no I/O requests associated with disk(i,j) in the STI(i) staging queue, the process generates a REQUEST SENSE command and inserts the command into the front of the STI(i) staging queue. The REQUEST SENSE command will then be executed, at step 418, as if it were any other disk I/O request, i.e., using the process of FIG. 3. Note that since the REQUEST SENSE command is an untagged command, a special index is reserved for it in the DIORMAP(i,j) execution list. After the REQUEST SENSE command has completed, the sense data returned is written into the disk I/O request K structure. The disk I/O request is removed from the disk(i,j) request sense pending queue and inserts onto the back of the input queue to its volume manager.

Although one embodiment incorporating the teachings of the present invention has been shown and described in detail herein, those skilled in the art can readily devise many other varied embodiments that still incorporate these teachings.

What is claimed is:

1. A queue architecture for a storage element array containing a plurality of storage elements comprising:
   a volume manager for generating an input/output (I/O) request that specifies a particular storage element to be accessed;
   means, connected to said volume manager, for allocating said I/O request to a particular pending queue, where said particular pending queue is selected in accordance with the storage element specified within the I/O request;

a staging queue, connected to said pending queue, for temporarily storing said I/O request until a communications channel is available to connect said staging queue to said storage element;

a timeout queue, connected to said staging queue, for temporarily storing said I/O request after the I/O request is placed on the communications channel and for removing said I/O request when said communications channel returns information corresponding to the I/O request.

2. The queue architecture of claim 1 further comprising mapping means, connected to said timeout queue, for storing a pointer into said timeout queue that indicates the storage location of a particular I/O request.

3. The queue architecture of claim 1 further comprising error handling queues, connected to said timeout queue, for temporarily storing I/O requests that were previously used to access a storage element, where information returned from the storage element indicates an error in accessing the storage element.

4. The queue architecture of claim 1 further comprising a count stamp means for attaching a count value to each I/O request, where said count stamp indicates the position within the timeout queue of the I/O request.

5. A method of accessing one of a plurality of storage elements in response to a request from a host computer, said method comprising the steps of:

generating an I/O request within a volume manager;

examining the I/O request to determine a particular storage element that the I/O request requires to access to fulfill the request from the host computer;

if a staging queue corresponding to a communications channel to the particular storage element is empty, transferring the I/O request to the empty staging queue;

otherwise, if a staging queue entry does not exists for the particular storage element in the staging queue, transferring the I/O request to the staging queue;

otherwise, transferring the I/O request to a pending queue; and transferring an I/O request at the front of the staging queue to the communications channel leading to a specified storage element and, when the I/O request is accepted by the specified storage element, transferring the I/O request at the front the staging queue to a timeout queue.

6. The method of claim 5 further comprising the step of writing, when said I/O request is transferred to said timeout queue, a pointer into a pointer map, where said pointer indicates a location of said I/O request within said timeout queue.

7. The method of claim 6 further comprising the step of transferring, if another I/O request is at the front of the pending queue, from the pending queue to the staging queue.

8. The method of claim 5 further comprising the step of disconnecting, after the I/O request is transferred to the communications channel, the communications channel from the timeout queue.

9. The method of claim 5 further comprising the step of assigning a count value as a count stamp to the I/O request that indicates the position of the I/O request within the timeout queue.

10. The method of claim 9 further comprising the steps of:

upon the occurrence of a catastrophic failure within the storage array, reading the count value of each I/O request within the timeout queue;

storing the I/O requests that are pending in the timeout queue in the staging queue in an order indicated by the count values assigned to each I/O request;

resetting one or more of the storage elements; and transferring an I/O request at the front of the staging queue to the communications channel leading to a specified storage element and, when the I/O request is accepted by the specified storage element, transferring the I/O request at the front the staging queue to a timeout queue.

11. The method of claim 8 further comprising the steps of:

reconnecting the communications channel to the timeout queue;

transferring from the specified storage element a status indicator representing the present status of the specified storage element;

if the status of the storage element specified by the I/O request indicates that the storage element is operating properly, then the I/O request is transferred from the timeout queue to the volume manager; and if the status indicates an error, then executing an error handling routine.

12. The method of claim 11 wherein the step of executing an error handling routine further comprises the steps of:

determining the status as a CHECK CONDITION status indicator;

transferring the I/O request associated with the CHECK CONDITION status indicator into a REQUEST SENSE pending queue; and issuing a REQUEST SENSE command to the storage element that produced the CHECK CONDITION status indicator.

* * * * *